United States Patent
Cheston et al.

(10) Patent No.: US 7,383,575 B2
(45) Date of Patent: Jun. 3, 2008

(54) SYSTEM AND METHOD FOR AUTOMATIC PASSWORD RESET

(75) Inventors: Richard W. Cheston, Morrisville, NC (US); Michael T. Vanover, Raleigh, NC (US); Steven R. Welch, Gilroy, CA (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 685 days.

(21) Appl. No.: 10/744,440

(22) Filed: Dec. 23, 2003

(65) Prior Publication Data

US 2005/0138399 A1 Jun. 23, 2005

(51) Int. Cl.
*H04L 9/32* (2006.01)

(52) U.S. Cl. .................. 726/16; 713/1; 713/182; 726/2

(58) Field of Classification Search ........ 713/182–186, 713/1, 2, 100, 189; 726/2–5, 16, 17, 20, 726/21, 34, 35; 714/100, 2, 3
See application file for complete search history.

(56) References Cited

U.S. PATENT DOCUMENTS

| | | | |
|---|---|---|---|
| 6,237,100 B1 * | 5/2001 | Cromer et al. ............. | 713/300 |
| 6,763,458 B1 * | 7/2004 | Watanabe et al. .......... | 713/100 |
| 6,871,286 B1 * | 3/2005 | Cagle et al. ................. | 726/5 |
| 6,934,881 B2 * | 8/2005 | Gold et al. .................. | 714/15 |
| 6,978,385 B1 * | 12/2005 | Cheston et al. ............. | 726/18 |
| 7,137,026 B2 * | 11/2006 | Aija et al. ................... | 714/4 |
| 2002/0065913 A1 * | 5/2002 | Harrington ................. | 709/225 |
| 2002/0147914 A1 | 10/2002 | Arnold ........................ | 713/186 |
| 2002/0171546 A1 * | 11/2002 | Evans et al. ................ | 340/540 |
| 2003/0028813 A1 * | 2/2003 | Lewis ......................... | 713/202 |
| 2003/0093680 A1 * | 5/2003 | Astley et al. ............... | 713/183 |
| 2003/0182584 A1 * | 9/2003 | Banes et al. ................ | 713/202 |
| 2004/0255106 A1 * | 12/2004 | Rothman et al. ............. | 713/1 |

FOREIGN PATENT DOCUMENTS

JP 11212922 A 6/1999
WO WO 00/72508 A1 11/2000

OTHER PUBLICATIONS

Technical Disclosure Bulletin: "Network Password Reset Application"—IBM. vol. 37, No. 1, Jan. 1994.
Technical Disclosure Bulletin: "Method of And Apparatus for Conveniently Resetting Electronic Lock of Computer System"—IBM. vol. 36, No. 8, Aug. 1993.
Technical Disclosure Bulletin: "Hard Disk Drive Access Password Support for Power Management"—IBM. vol. 37, No. 12, Dec. 1994.
Technical Disclosure Bulletin: "Illegal Access History in Hard Disk Drive"—IBM. vol. 37, No. 11, Nov. 1994.
Technical Disclosure Bulletin: "Automated Password Resets for End Users"—IBM. vol. 39, No. 12, Dec. 1996.

* cited by examiner

*Primary Examiner*—Nasser Moazzami
*Assistant Examiner*—Nirav Patel
(74) *Attorney, Agent, or Firm*—John L. Rogitz

(57) ABSTRACT

The loss of a computer's primary O.S. password, BIOS password, or HDD password (or even an application password) is sensed by a secondary O.S. based on a number of failed log on attempts to the affected component. The password can be reset by having the secondary O.S. generate an intermediate password automatically, verify user authorization, and then make the intermediate password available to, e.g., the primary O.S., so that the affected component can be accessed and its password reset without help desk personnel intervention.

10 Claims, 2 Drawing Sheets

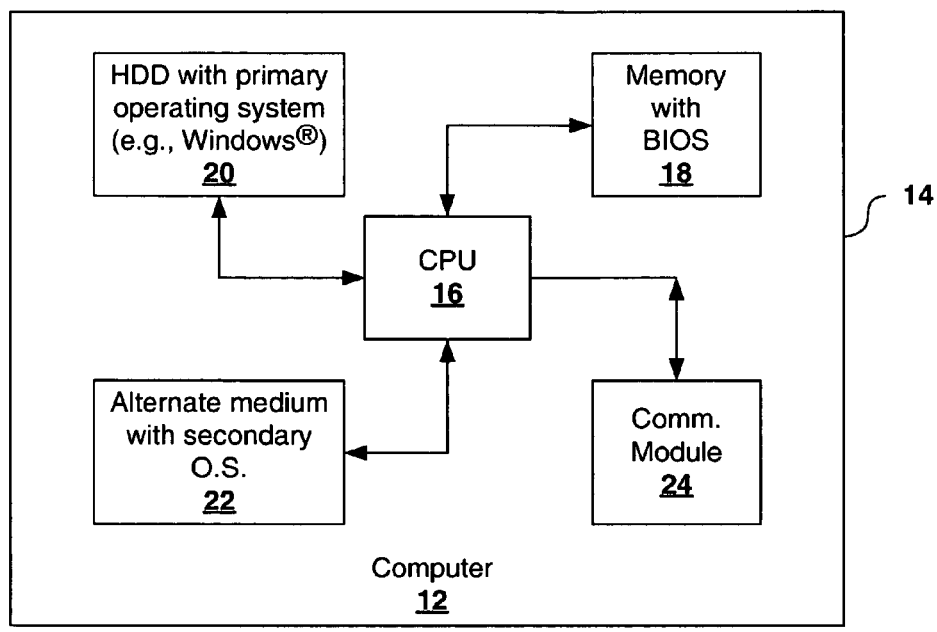
Fig. 1
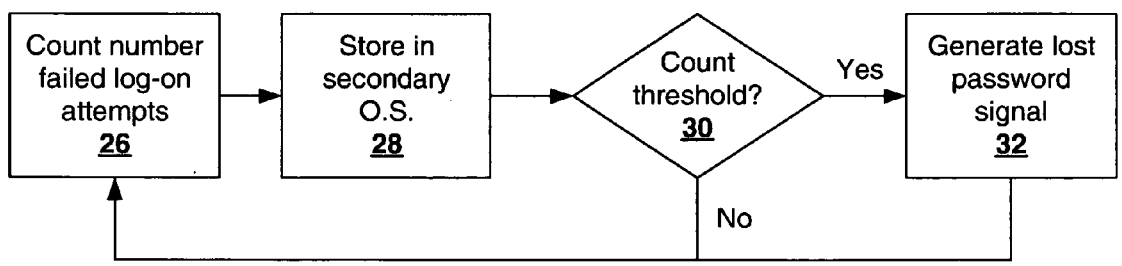
Fig. 2 - sensory mechanism logic

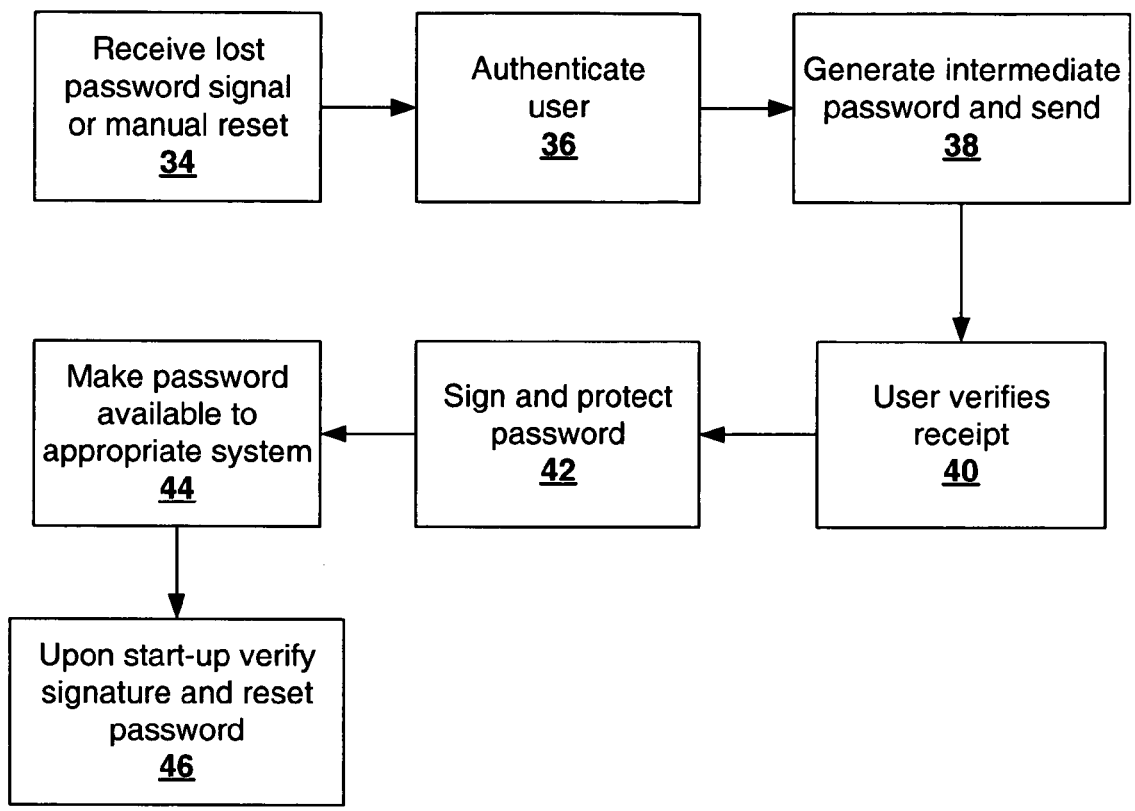
*Fig. 3* -
effector mechanism logic

SYSTEM AND METHOD FOR AUTOMATIC PASSWORD RESET

FIELD OF THE INVENTION

The present invention relates generally to computing devices.

BACKGROUND OF THE INVENTION

When a computer password is lost or forgotten, whether for hardware or software, it must be reset, requiring the intervention of a system manager or administrator or other so-called "help desk" personnel. Resetting passwords consumes considerable manager/administrator time. Passwords that might be forgotten or lost include personal computer (PC) basic input output system (BIOS) passwords, hard disk drive (HDD) access passwords, operating system passwords such as Windows7 passwords, and application passwords such as the IBM Global Dialer, Lotus Notes or other protected data or applications.

Securely resetting a password is currently undertaken by the help desk after receiving a user help desk call or trouble ticket report of a lost or forgotten password and then generating a random temporary password. The temporary password is sent to the user by e-mail (unless the e-mail password is involved), or voice mail, or the postal service. Thus, much of the password reset process requires the costly attention and time of help desk personnel.

In addition to the above problems, the present invention recognizes particular drawbacks to current password reset methods, including the fact that remote mechanisms for setting passwords may require unique system and user authentication mechanisms that are independent from the password being reset. Moreover, as understood herein current BIOS passwords can only be reset locally from the keyboard after supplying either the password being reset or the corresponding master password for the function. Still further, without a valid Windows access password, a user has no guaranteed mechanism of resetting the Windows password. Simply allowing a user to reset his or her own password by giving the user an administrator's ID/password plainly compromises the integrity of the system. Also, some enterprises maintain a central record of the set of user passwords in an enterprise to facilitate resetting a lost password, but this means that the user cannot modify passwords when disconnected as may be required during travel since the central location might not contain the most recent local password values. With these drawbacks in mind, the present invention has been provided.

SUMMARY OF THE INVENTION

A computer system includes a CPU, a primary O.S. executable by the CPU, a HDD storing a copy of the primary O.S., and a memory accessible by the CPU and storing a basic input output system (BIOS). The system also includes a secondary O.S. In accordance with the present invention, the secondary O.S. can generate a password reset signal based on a number of unsuccessful log on attempts to any of the BIOS, HDD, and primary O.S. (as well as to primary O.S. applications), and/or the secondary O.S. can, based on a reset signal, automatically generate an intermediate password useful for accessing a component associated with the password to be reset.

In a preferred embodiment, the reset signal is generated by the secondary O.S. based on a count of failed logon attempts generated by the primary O.S. Alternatively, the reset signal is generated by a human user. The preferred intermediate password is sent to a user, which sends back verification of receipt. The password is then protected by digitally signing and encrypting the password prior to making the password available to the primary O.S. Desirably, the secondary O.S. makes the intermediate password available to the primary O.S., and the primary O.S. can determine when an intermediate password is available upon start up of the primary O.S. and if so, reset the password to be the intermediate password. The primary O.S. contains system BIOS and conventional O.S.

In another aspect, a computer system undertakes logic that includes maintaining a count of a number of failed log on attempts, and making the count available to a secondary computer operating system (O.S.) that is a different O.S. than a primary O.S. used by a computer associated with the log on attempts. The logic also includes, based on the relationship of the count with a policy-based threshold, selectively generating a password reset signal.

In still another aspect, a computer system undertakes logic for resetting an operating password associated with a primary operating system (O.S.), a hard disk drive (HDD), or a basic input output system (BIOS). The logic includes automatically generating an intermediate password using a secondary operating system, and providing the intermediate password to a primary operating system to reset the operating password.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present architecture;
FIG. 2 is a flow chart of the lost password sensor mechanism logic; and
FIG. 3 is a flow chart of the password reset effector logic.

DETAILED DESCRIPTION OF THE PREFERRED EMBODIMENT

Referring initially to FIG. 1, a computing system is shown, generally designated 10, that includes a user computer 12. The computer 12 can be any suitable computer, e.g., a personal computer or larger, a laptop computer, a notebook computer or smaller, etc.

As shown in FIG. 1, the preferred non-limiting computer 12 includes a housing 14 in which is mounted at least one main central processing unit (CPU) 16 that can communicate with a solid state memory 18 in the housing 14. The memory 18 can contain basic input/output system (BIOS) instructions useful for booting the computer 12 at start up. Additionally, other storage can be provided, e.g., a hard disk drive (HDD) 20 that can hold a copy of a primary operating system, such as Windows7, for the computer 12 to load into memory 18 upon start up in accordance with operating system principles known in the art.

Additionally, an alternate storage medium 22 can be accessible by the CPU 16. The alternate storage medium 22 may be inside or external to the housing 14, and in the preferred embodiment the alternate storage medium 22 stores a secondary operating system such as, e.g., IBM's Client Rescue and Recovery system, for purposes to be shortly disclosed. The alternate storage medium 22 may be, e.g., a compact disk or digital video disk (CD/DVD), a universal serial bus (USB) memory key, a USB-connected external HDD, an "Ultrabay" HDD, a microdrive, and a PXE network boot. Various communication modules 24 such as wireless communication modules may also be provided.

As used herein, the word "password" encompasses any computer access credential, including a password proper as well as any combination of password, keys, certificates or any other credential, especially those that are electronically transferable and used to authenticate a user's or system's access to local or remote resources, e.g., including a password for VPN access.

As discussed further below in reference to FIGS. 2 and 3, the present invention contemplates two potentially independent components, namely, a password reset sensor mechanism (FIG. 2) for determining when a situation requiring a password reset is present with little or no intervention from the user, and a password reset effector (FIG. 3) for resetting the password.

Now referring to FIG. 2, the logic of the sensor mechanism may be seen. Commencing at block 26, the number of failed log-on attempts is counted. In the case of a lost primary O.S. (e.g., Windows) password, the logic may be executed in Windows with system credentials so that it is active even when no user is logged in. The logic may access the Windows Graphical Identification and Authentication (GINA) to keep a record of the number of failed attempts to log onto Windows. When a successful logon occurs, the count of failed logon attempts is reset.

At block 28 the count of failed log on attempts is stored outside the primary O.S. file system. For instance, the count could be stored in a separate file allocation table (FAT) partition that can be read by the secondary O.S., such as IBM's Client Rescue and Recovery system. Because the user cannot gain local access into Windows due to the lost password, the user must change (e.g., by boot, hypervisor swap, or hibernation swap) to the secondary O.S., which upon starting up executes the decision at diamond 30, namely, determining whether the count is great enough to trigger generation of a lost password signal at block 32. The functional comparison logic is controlled by policy including enablement and conditions of comparison. If desired, the lost password signal can indicate a certainty level regarding whether the password truly is lost, depending on the magnitude of the number of failed log on attempts.

In the context of a BIOS system password, the above logic is essentially followed, with the following caveats. It is possible to allow a version of the secondary O.S. to run even if the BIOS system password, the primary O.S. password, or both are required but unavailable. In the same fashion as mentioned above for the primary O.S. password, a failed BIOS system password count is maintained externally by the secondary O.S., which executes the logic above based on the failed BIOS log on count.

In the context of a lost password for the HDD 20, the secondary O.S. is booted from another medium other than the local HDD, i.e., from the alternate medium 22, and then the logic above is executed based on a count of failed HDD log on attempts that is maintained externally by the secondary O.S. Alternatively, instead of using the alternate medium 22, a limited version of the secondary O.S. can be stored on and can boot and run from the HDD 20 without the HDD password, but because this would require a significant change to current HDDs, it is not preferred. The principles above may also be invoked to sense a lost application password.

FIG. 3 shows generic logic that can be implemented in the secondary O.S. by the effector mechanism to remedy (as by resetting) a lost password. To exemplify the logic, it will first be assumed that a primary O.S. password has been lost, requiring a password reset.

Commencing at block 34, the lost password signal from the sensor mechanism can be received, or a user-generated (manual) reset request can be received. At block 36, the user is authenticated. The nature of the authentication required is determined by policy. In some systems, for instance, users may be prohibited from resetting passwords altogether. On the other hand, in some systems select groups of users may be required to use some form of hardware token as part of the authentication, while for other users, a simple Internet password may be sufficient to authenticate the user. In the context of resetting BIOS or HDD passwords, it may be preferred that strong user and system authentication and hardware support be used, e.g., strong authentication that is tied to a hardware token.

Proceeding to block 38 assuming successful authentication at block 36, an intermediate password is automatically generated and provided to the user. At block 40, the user verifies receipt, such as by the mechanism of entering the new password twice correctly in succession.

Once it has been verified that the user has received the new randomly generated password, at block 42 the secondary O.S. signs and protects (as by encryption using public key/private key principles known in the art) the new password preferably with the strongest security mechanism available on the computer 12, e.g., software, an external hardware token, or embedded security. If the computer 12 has only software security to protect the primary O.S. password, for example, then protecting an intermediate version of the new password by a comparable security mechanism is appropriate. Likewise, for a computer 12 that uses an embedded security chip such as a trusted platform module (TPM), the same hardware can be used by the secondary O.S. to protect the new O.S. password.

Proceeding to block 44, the encrypted and signed intermediate password is written by the secondary O.S. to a location that can be accessed by the primary O.S. Proceeding to block 46, a primary O.S. Service that preferably runs with system administrator credentials at the start of the user's primary operating system monitors the presence of data indicating whether a new intermediate password exists and should be applied. If so, the signature is verified, and if it is valid, the password is decrypted and the primary O.S. password is reset by the service to the new intermediate password, which can then be used by the user to log on to or otherwise access the primary O.S. While effective for resetting a user O.S. password, the above logic preferably is not used to set the primary administrator's password, which is typically not used by end users in a managed large enterprise in any case.

With this logic, the secondary O.S. need not know the primary administrator's O.S. password. Instead, the exchange of the new intermediate password is accomplished using existing public key technology.

Alternatively, the Admin password for Windows or the Master password for the BIOS controlled Power On password or Hard Disk Drive password can be protected. Information can be passed to the system from a secure external network authenticated source, to allow the alternate O.S. to control a sequence in which it walks the user through the steps for resetting the corresponding user password without revealing the master or admin password in any case.

In the context of resetting a lost BIOS or HDD password, the above logic may be invoked with the following caveats. The logic of FIG. 3 can be used to allow the reset of either the user level BIOS/HDD password or the master password that is intended for the entire information technology (IT) organization. Optionally the logic can allow the user level password to be reset by giving the secondary O.S. access to the master password. In the case of the user level password, the user receives and validates his or her reception of the new password as described, but in the case of resetting a master password, the intermediate master password can be directly transferred to the system's BIOS without user intervention.

The logic of FIG. 3 can also be used to reset a primary O.S. application password, such as might be required for individual applications such as Lotus Notes which provide an external mechanism for securely resetting the user password, namely, the user's ID file. Or, the application can use a more comprehensive and simpler approach using a password banking technology. In either approach the credentials can be protected locally, by software or embedded security, or remotely and applied after any required authentication as required by the particular local policy. In the typical case of losing the password to a bank, the credentials to the bank itself have been lost, but the credentials for the individual applications are still protected in the bank. If the entire bank is lost or damaged for some reason, then either a remotely stored version of the bank must first be restored, or the situation reverts to the individual application case. The logic of FIG. 3 can be used where the secondary O.S. authenticates and validates a new randomly generated password then passes the information through a primary O.S. service to either the individual application or the password bank as appropriate.

With the above in mind, it may now be appreciated that the present invention functions for a broad spectrum of platforms with differing levels of security by providing a level of security for the password reset process which is consistent with that elsewhere in the system. Also, the sensor mechanisms transparently detect the lost password situations, thus removing some or all of the burden on the user. Moreover, the effector mechanism can reset a password when the computer 12 is in a disconnected mode if desired by policy. Furthermore, the password can be reset by a remotely controlled but still automated mechanism. And, system manager/administrator have as much or as little control over the reset process as desired through policy, which can differ from sub-group to sub-group within an information technology (IT)-managed organization.

While the particular SYSTEM AND METHOD FOR AUTOMATIC PASSWORD RESET as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

We claim:

1. A computer system comprising:
   at least one central processing unit (CPU);
   at least one primary operating system (O.S.) executable by the CPU;
   at least one hard disk drive (HDD) storing a copy of the primary O.S. and being accessible by the CPU;
   at least one memory accessible by the CPU, the memory storing a basic input output system (BIOS) executable by the CPU; and
   at least one secondary O.S., wherein at least one of the primary O.S., BIOS, and HDD is associated with a password to be reset, the secondary O.S. undertaking at least one of:
      generating a password reset signal based at least in part on a number of unsuccessful log on attempts; and
      based on a reset signal, automatically generating at least one intermediate password useful for accessing a component associated with the password to be reset.

2. The system of claim 1, wherein the BIOS is associated with at least one BIOS password, the BIOS password establishing the password to be reset.

3. The system of claim 1, wherein the primary O.S. is associated with at least one primary O.S. password, the primary O.S. password establishing the password to be reset.

4. The system of claim 1, wherein the HDD is associated with at least one HDD password, the HDD password establishing the password to be reset.

5. The system of claim 1, wherein the reset signal is generated by the secondary O.S.

6. The system of claim 1, wherein the reset signal is generated by a human user.

7. The system of claim 1, wherein the intermediate password is sent to a user and, if verification of receipt is made, the intermediate password is then is protected prior to making the password available to the primary O.S.

8. The system of claim 1, wherein the secondary O.S. makes the intermediate password available to the primary O.S., and wherein the primary O.S. determines when an intermediate password is available upon start up of the primary O.S., and if so, resets at least one password to be the intermediate password.

9. A service comprising:
   maintaining a count of a number of failed log on attempts;
   making the count available to a secondary computer operating system (O.S.), the secondary O.S. being a different O.S. than a primary O.S. used by a computer associated with the log on attempts; and
   based at least in part on the relationship of the count with a threshold, selectively generating a password reset signal, wherein the password reset signal is used by the secondary O.S. to automatically generate an intermediate password useful for resetting at least one of: a lost primary O.S. password, a BIOS password, and a HDD password.

10. The service of claim 9, further comprising resetting the count upon the occurrence of a successful logon attempt.

* * * * *